(12) United States Patent
Yu et al.

(10) Patent No.: US 9,643,793 B2
(45) Date of Patent: May 9, 2017

(54) ROTATING MECHANISM

(71) Applicants: SHENZHEN FUTAIHONG PRECISION INDUSTRY CO., LTD., Shenzhen (CN); FIH (HONG KONG) LIMITED, Kowloon (HK)

(72) Inventors: Fei Yu, Shenzhen (CN); Shi-Long Guo, Shenzhen (CN); Jian-Ping Jin, Shenzhen (CN); Dao-Ping Zhang, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 232 days.

(21) Appl. No.: 14/554,875

(22) Filed: Nov. 26, 2014

(65) Prior Publication Data

US 2015/0183590 A1 Jul. 2, 2015

(30) Foreign Application Priority Data

Dec. 31, 2013 (CN) .......................... 2013 1 0747722

(51) Int. Cl.
*B65G 47/248* (2006.01)
(52) U.S. Cl.
CPC .................. *B65G 47/248* (2013.01)
(58) Field of Classification Search
CPC ....... B65G 47/248; B65G 17/48; B65G 21/16
USPC .................................................. 414/773, 758
See application file for complete search history.

(56) References Cited

U.S. PATENT DOCUMENTS

| | | | | | |
|---|---|---|---|---|---|
| 3,314,522 | A | * | 4/1967 | Croall | B65G 47/24 198/417 |
| 3,961,705 | A | * | 6/1976 | Suciu | B08B 9/205 198/402 |
| 4,171,739 | A | * | 10/1979 | Yamato | A23L 3/001 198/704 |
| 4,492,299 | A | * | 1/1985 | McLeod | B65G 47/248 193/46 |
| 5,609,237 | A | * | 3/1997 | Lenhart | B65G 47/248 198/406 |
| 2005/0247547 | A1 | * | 11/2005 | Frost | B65G 47/248 198/839 |
| 2007/0289255 | A1 | * | 12/2007 | Brugger | B65B 35/58 53/396 |

\* cited by examiner

*Primary Examiner* — Michael McCullough
*Assistant Examiner* — Lynn Schwenning
(74) *Attorney, Agent, or Firm* — Steven Reiss

(57) ABSTRACT

A rotating mechanism includes a base, a number of rotating assemblies, and a transmitting assembly. The rotating assemblies are secured on the base. Each rotating assembly includes a rotating table and a limiting assembly assembled to the rotating table. The rotating table of each rotating assembly is substantially collinear and inclined a certain degree relative to a previous rotating table. The limiting assembly defines a channel. The transmitting assembly is received in the channels. When the transmitting assembly moves along the channels, the transmitting assembly is rotated.

17 Claims, 5 Drawing Sheets

ROTATING MECHANISM

FIELD

The disclosure generally relates to rotating mechanisms, and particularly to a rotating mechanism used to rotate work pieces during manufacture such as baking, and leveling.

BACKGROUND

During manufacture, painting is a kind of common technology means and has always been an indispensable step. After painting, work pieces usually need to be baked or leveled. To obtain better baking and leveling effect, the work pieces should be rotated. However, in order to achieve a large rotating action, a typical rotating mechanism correspondingly has a large volume and a complex structure, which is unsuitable for a narrow and small working space.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
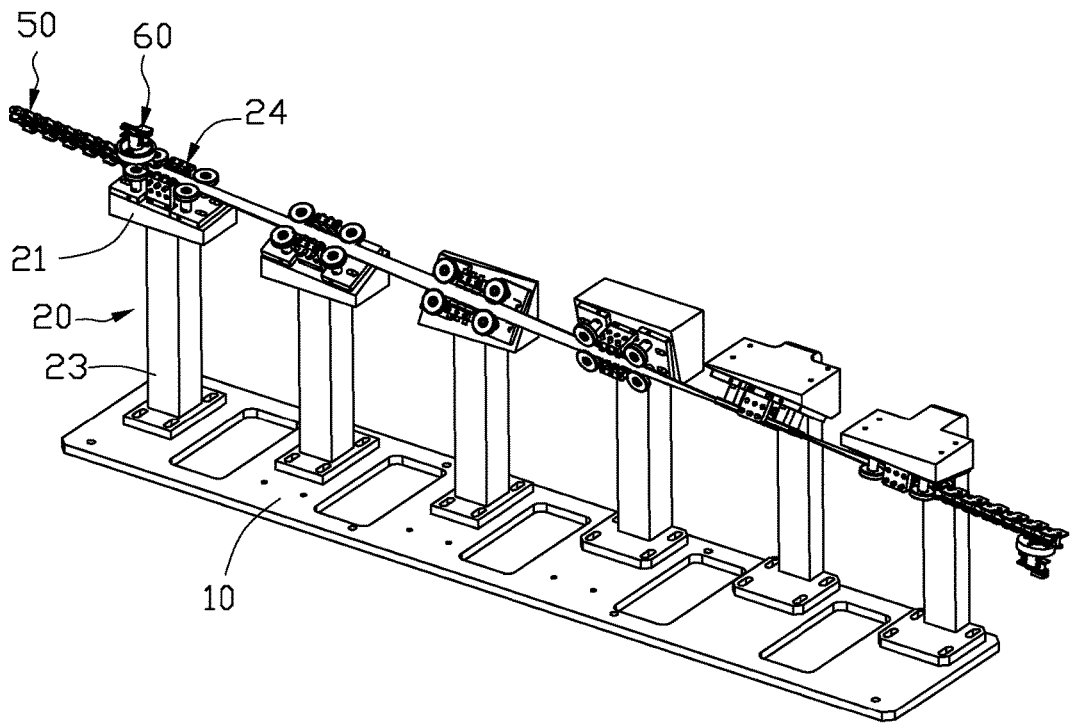
FIG. 1 is an isometric view of a rotating mechanism, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 shows an isometric view of a rotating mechanism 100, according to an exemplary embodiment. The rotating mechanism 100 is used to transmit and rotate work pieces (not shown) during manufacture. The rotating mechanism 100 includes a base 10, a plurality of rotating assemblies 20, a transmitting assembly 50 and a fixing member 60.

Figure 2:
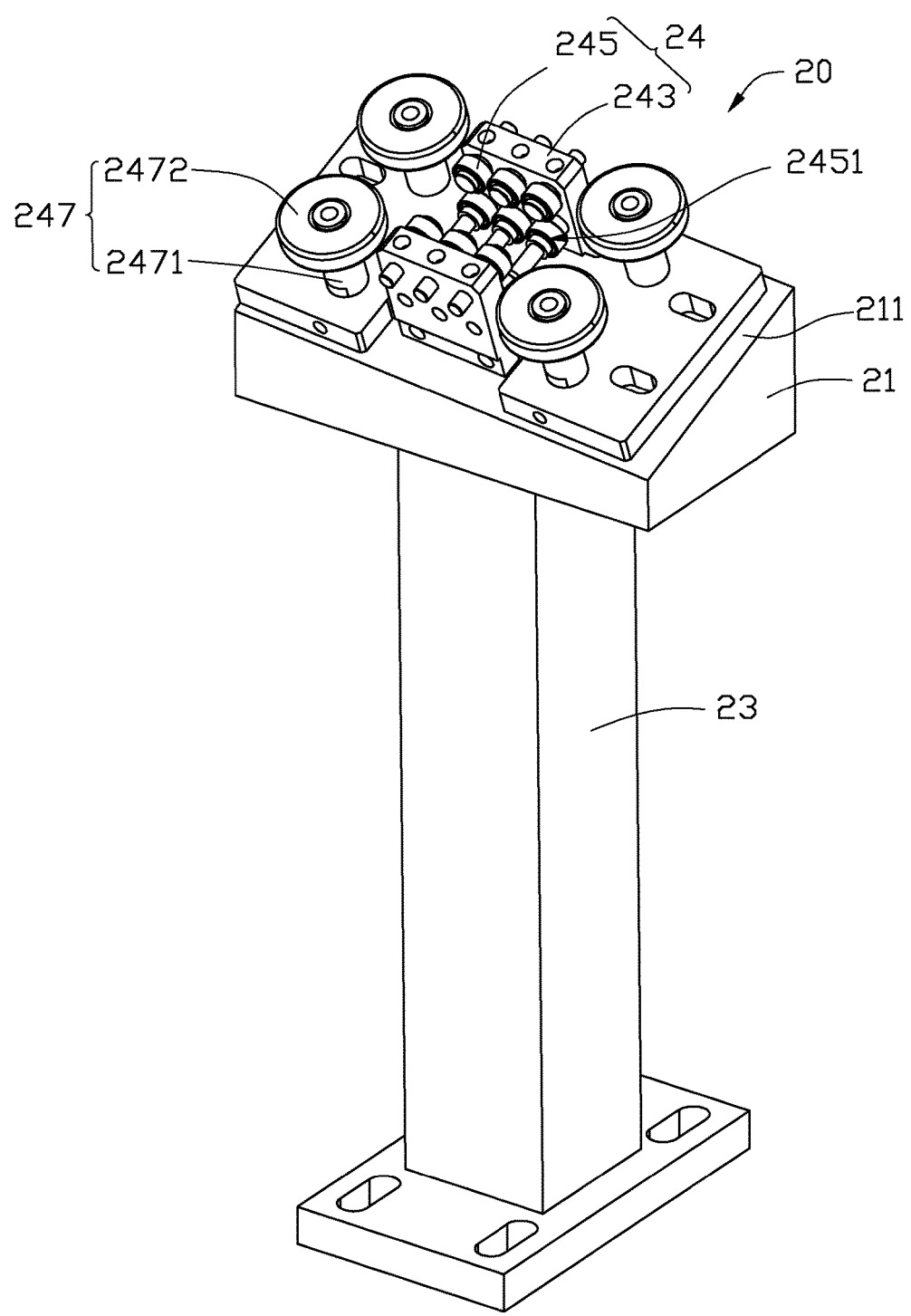
FIG. 2 is an isometric view of a rotating assembly of the rotating mechanism of FIG. 1.

FIG. 2 shows that, the rotating assemblies 20 are secured on the base 10 and spaced from each other. The rotating assemblies 20 are configured to rotate the transmitting assembly 50. In this exemplary embodiment, there are six rotating assemblies 20.

Each rotating assembly 20 includes a rotating table 21, a supporting post 23, and a limiting assembly 24.

The rotating tables 21 are substantially colinear. Each rotating table 21 includes a resisting surface 211. The resisting surface 211 of an initial rotating table 21 which may be adjacent to a feed inlet (not shown) is substantially horizontal and opposite to the base 10. The resisting surface 211 of remaining rotating tables 21 are inclined a certain degree relative to the resisting surface 211 of previous rotating tables 21, for example, about 36 degrees. Therefore, the resisting surface 211 of a distal rotating table 21 which may be adjacent to a discharge outlet (not shown) is also substantially horizontal but facing the base 10. That is the resisting surface 211 of the distal rotating table 21 is rotated about 180 degrees relative to the resisting surface 211 of the initial rotating table 21.

In another embodiment, the resisting surface 211 of the initial rotating table 21 can be inclined relative to a horizontal plane.

Furthermore, the resisting surface 211 of the remaining rotating tables 21 can be also inclined other degrees relative to the resisting surface 211 of the previous rotating tables 21 as long as the resisting surface 211 of the distal rotating table 21 is rotated about 180 degrees relative to the resisting surface 211 of the initial rotating table 21.

In addition, the resisting surface 211 of the distal rotating table 21 can be rotated other degrees relative to the resisting surface 211 of the initial rotating table 21 as long as the resisting surface 211 of the distal rotating table 21 is positioned at a suitable degree for manufacture.

The supporting posts 23 are substantially positioned on the base 10 and spaced from each other. A first end of each supporting post 23 is secured to the base 10. A second end of each supporting post 23 is connected to one of the rotating tables 21.

Figure 3:
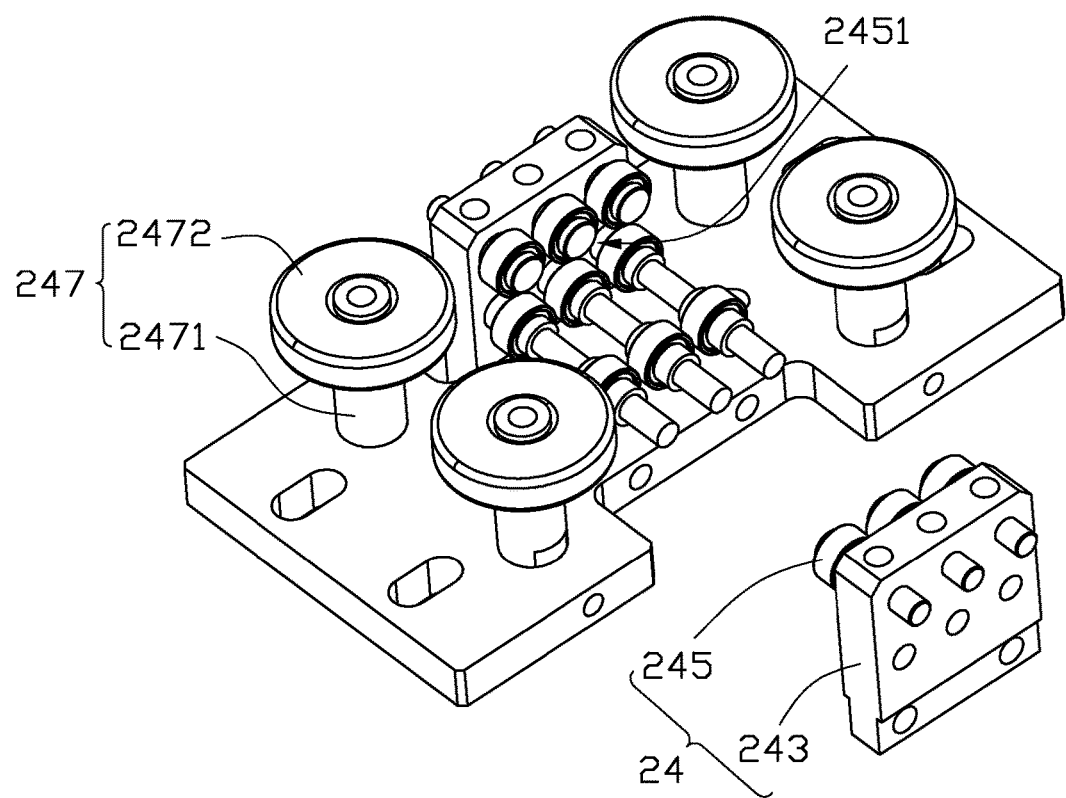
FIG. 3 is a disassembled, partial view of a limiting assembly of the rotating mechanism of FIG. 1.

The limiting assemblies 24 are configured to prevent the transmitting assembly 50 from escaping from the rotating assemblies 20. FIG. 3 shows that each limiting assembly 24 is secured on the resisting surface 211 of the corresponding rotating table 21. Each limiting assembly 24 includes two opposite connecting plates 243, a plurality of bearings 245, and a plurality of limiting members 247. The connecting plates 243 are perpendicularly secured on one of the resisting surfaces 211 and configured to fix the bearings 245. The bearings 245 are secured on the connecting plates 243 and form a channel 2451. The transmitting assembly 50 extends through the channels 2451. The bearings 245 are configured to limit the transmitting assembly 50 to shift along a direction parallel to the resisting surface 211. Each limiting member 247 includes a rotating shaft 2471 and a rotating tray 2472. A first end of the rotating shaft 2471 is secured on the resisting surface 211. A second end of the rotating shaft 2471 is rotatably connected to a center of the rotating tray 2472. The rotating trays 2472 press on the transmitting assembly 50 received in the channels 2451 to limit the transmitting assembly 50 to shift along a direction perpendicular to the resisting surface 211.

Figure 4:
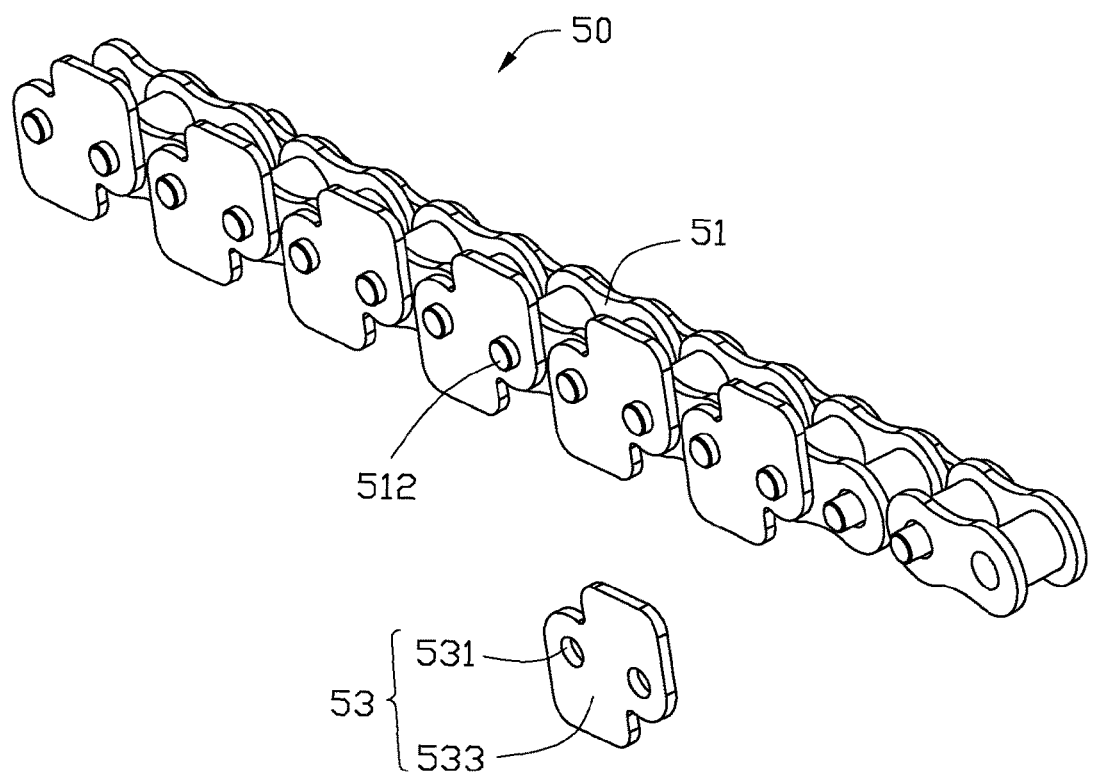
FIG. 4 is an isometric view of a transmitting assembly of the rotating mechanism of FIG. 1.

FIG. 4 shows that the transmitting assembly 50 includes a chain 51 (briefly shown in FIG. 1) and a plurality of limiting plates 53. The chain 51 includes a plurality of pins 512. Each limiting plate 53 includes two through holes 531 and two extending portions 533. A first end of the pins 512 are latched into the through holes 531 to fix the limiting plates 53 to the chain 51. When the chain 51 is received in the channels 2451, the extending portions 533 are received in the channels 2451 to prevent the transmitting assembly 50 from escaping from the channels 2451.

Figure 5:
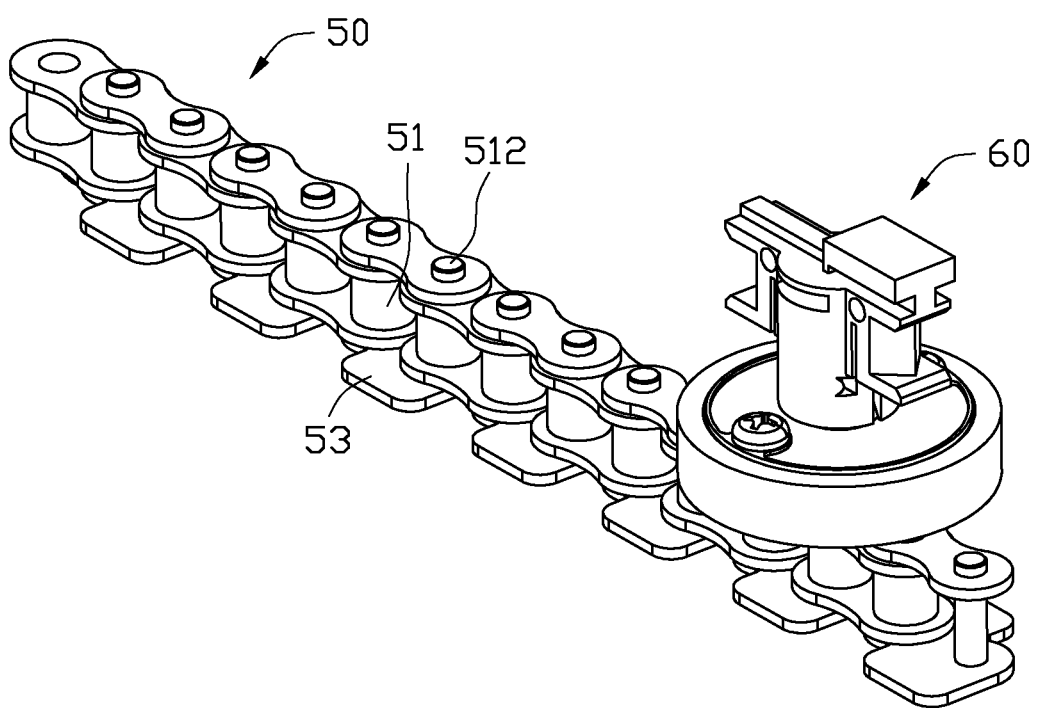
FIG. 5 is an assembled, isometric view of the transmitting assembly and a fixing member of the rotating mechanism of FIG. 1.

FIG. 5 shows that, the fixing members 60 are configured to fix the work pieces. Each fixing member 60 is secured to a second end of the pins 512 opposite to the limiting plates 53.

In use, the work pieces are fixed on the fixing members 60. The transmitting assembly 50 can be linearly moved along the channels 2451 by a driver (not shown). Because the resisting surface 211 of the distal rotating table 21 is rotated about 180 degrees relative to the resisting surface 211 of the initial rotating table 21, when the transmitting assembly 50 is moved from the initial rotating table 21 to the distal rotating table 21, the transmitting assembly 50 is rotated about 180 degrees. Therefore, the work pieces can be also rotated about 180 degrees with the transmitting assembly 50 when the work pieces are transmitted from the feed inlet to the discharge outlet.

In another embodiment, the work pieces can be also rotated other degrees by setting a different inclining degree of the resisting surface 211.

The rotating mechanism 100 that realizes rotate the work pieces by the rotating assemblies 20 and the transmitting assembly 50 has a relative simpler structure and smaller volume which can be used in a narrow and small working space.

It is to be understood, however, that even through numerous characteristics and advantages of the present disclosure have been set forth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A rotating mechanism comprising:
   a base;
   a plurality of rotating assemblies secured on the base, each rotating assembly comprising:
      a rotating table, the rotating table of each rotating assembly substantially collinear and inclined a certain degree relative to a previous rotating table; and
      a limiting assembly assembled to the rotating table, the limiting assembly defining a channel; and
   a transmitting assembly received in the channels;
   wherein when the transmitting assembly moves along the channels, the transmitting assembly is rotated relative to an axis that is parallel to the direction of travel of the transmitting assembly;
   wherein each limiting assembly comprises two opposite connecting plates perpendicularly secured on one of the resisting surfaces and a plurality of bearings secured on the connecting plates and forming the channel, the bearings limit the transmitting assembly to shift along a direction parallel to the rotating table;
   wherein each limiting assembly further comprises a plurality of limiting members, each limiting member comprises a rotating shaft and a rotating tray, a first end of the rotating shaft is secured on the resisting surface, a second end of the rotating shaft is rotatably connected to a center of the rotating tray, the rotating trays press on the transmitting assembly received in the channels to limit the transmitting assembly to shift along a direction perpendicular to the rotating table.

2. The rotating mechanism of claim 1, wherein each rotating table comprises a resisting surface, each resisting surface is inclined the certain degree relative to a previous resisting surface, the limiting assembly is secured on the resisting surface.

3. The rotating mechanism of claim 1, wherein transmitting assembly comprises a chain, the chain extends through the channels.

4. The rotating mechanism of claim 3, wherein transmitting assembly further comprises a plurality of limiting plates secured on a first side of the chain, the limiting plates are received in the channels to prevent the transmitting assembly from escaping from the channels when the chain is received in the channels.

5. The rotating mechanism of claim 4, further comprising a fixing member, wherein the fixing member secured on a second side of the chain opposite to the limiting plates.

6. The rotating mechanism of claim 1, wherein when the transmitting assembly moves along the channels from a initial rotating table to a distal rotating table, the transmitting assembly is rotated about 180 degrees.

7. A rotating mechanism comprising:
   a base;
   a plurality of rotating assemblies secured on the base, each rotating assembly comprising:
      a rotating table, the rotating table of each rotating assembly substantially collinear and inclined a certain degree relative to a previous rotating table; and
      a limiting assembly assembled to the rotating table; and
   a transmitting assembly positioned on the rotating tables;
   wherein when the transmitting assembly moves from an initial rotating table to a distal rotating table, the rotating tables rotate the transmitting assembly relative to an axis that is parallel to the direction of travel of the transmitting assembly and the limiting assembly limits the transmitting assembly to shift along parallel and perpendicular directions relative to the rotating table;
   wherein each rotating table comprises a resisting surface, each resisting surface is inclined the certain degree relative to a previous resisting surface, the limiting assembly is secured on the resisting surface.

8. The rotating mechanism of claim 7, wherein each limiting assembly comprises two opposite connecting plates perpendicularly secured on one of the resisting surfaces and a plurality of bearings secured on the connecting plates and forming a channel, the transmitting assembly is received the channels, the bearings limit the transmitting assembly to shift along the direction parallel to the rotating table.

9. The rotating mechanism of claim 8, wherein each limiting assembly further comprises a plurality of limiting members, each limiting member comprises a rotating shaft and a rotating tray, a first end of the rotating shaft is secured on the resisting surface, a second end of the rotating shaft is rotatably connected to a center of the rotating tray, the rotating trays press on the transmitting assembly received in the channels to limit the transmitting assembly to shift along the direction perpendicular to the rotating table.

10. The rotating mechanism of claim 7, wherein transmitting assembly comprises a chain, the chain extends through the channels.

11. The rotating mechanism of claim 10, wherein transmitting assembly further comprises a plurality of limiting plates secured on a first side of the chain, the limiting plates are received in the channels to prevent the transmitting assembly from escaping from the channels when the chain is received in the channels.

12. The rotating mechanism of claim 11, further comprising a fixing member, wherein the fixing member secured on a second side of the chain opposite to the limiting plates.

13. The rotating mechanism of claim 7, wherein when the transmitting assembly moves from a initial rotating table to a distal rotating table, the transmitting assembly is rotated about 180 degrees.

14. A rotating mechanism comprising:
a base;
a plurality of rotating assemblies secured on the base, each rotating assembly comprising:
a rotating table, the rotating table of each rotating assembly substantially collinear and inclined a certain degree relative to a previous rotating table; and
a limiting assembly assembled to the rotating table, the limiting assembly defining a channel; and
a transmitting assembly received in the channels; wherein when the transmitting assembly moves along the channels, the transmitting assembly is rotated relative to an axis that is parallel to the direction of travel of the transmitting assembly wherein the transmitting assembly comprises a chain and a plurality of limiting plates secured on a first side of the chain, the chain extends through the channels, the limiting plates are received in the channels to prevent the transmitting assembly from escaping from the channels when the chain is received in the channels.

15. The rotating mechanism of claim 14, wherein each rotating table comprises a resisting surface, each resisting surface is inclined the certain degree relative to a previous resisting surface, the limiting assembly is secured on the resisting surface.

16. The rotating mechanism of claim 15, further comprising a fixing member, wherein the fixing member secured on a second side of the chain opposite to the limiting plates.

17. The rotating mechanism of claim 14, wherein when the transmitting assembly moves along the channels from a initial rotating table to a distal rotating table, the transmitting assembly is rotated about 180 degrees.

\* \* \* \* \*